United States Patent
Riesberg et al.

(10) Patent No.: US 8,588,987 B2
(45) Date of Patent: Nov. 19, 2013

(54) WIND FARM AND METHOD FOR CONTROLLING A WIND FARM

(75) Inventors: André Riesberg, Wallenhorst (DE); Henning Rademacher, Westerroenfeld (DE); Hennig Harden, Hamburg (DE); Guntram Kunft, Rendsburg (DE)

(73) Assignee: REpower Systems SE, Hamburg (DE)

( * ) Notice: Subject to any disclaimer, the term of this patent is extended or adjusted under 35 U.S.C. 154(b) by 369 days.

(21) Appl. No.: 12/823,842

(22) Filed: Jun. 25, 2010

(65) Prior Publication Data
US 2010/0332042 A1 Dec. 30, 2010

(30) Foreign Application Priority Data
Jun. 26, 2009 (DE) .......................... 10 2009 030 725

(51) Int. Cl.
*G05D 3/12* (2006.01)
*G05B 19/18* (2006.01)
*G05B 11/01* (2006.01)

(52) U.S. Cl.
USPC .......... 700/287; 700/3; 700/4; 700/9; 700/19; 700/20; 700/82; 290/44

(58) Field of Classification Search
USPC ............. 700/3, 4, 9, 10, 19, 20, 82, 287, 297, 700/298; 290/44
See application file for complete search history.

(56) References Cited

U.S. PATENT DOCUMENTS

| | | | |
|---|---|---|---|
| 6,061,600 A * | 5/2000 | Ying | .............................. 700/3 |
| 7,606,638 B2 | 10/2009 | Fortmann et al. | |
| 7,962,246 B2 * | 6/2011 | Middendorf et al. | ......... 700/287 |
| 2007/0299548 A1 | 12/2007 | Weitkamp | |
| 2008/0088129 A1 * | 4/2008 | Altemark et al. | ............... 290/44 |
| 2009/0096211 A1 * | 4/2009 | Stiesdal | .......................... 290/44 |

(Continued)

FOREIGN PATENT DOCUMENTS

| | | |
|---|---|---|
| DE | 10 2004 048 341 | 4/2006 |
| DE | 10 2004 048 341 A1 | 4/2006 |

(Continued)

OTHER PUBLICATIONS

Brauner, G. (1999). "Connection of Wind Power Stations to the Power System," *E & I Elektrotechnik und Infromationstechnik* 116(7-8): 428-432 (with English abstract).

(Continued)

*Primary Examiner* — Sean Shechtman
(74) *Attorney, Agent, or Firm* — Morrison & Foerster LLP

(57) ABSTRACT

A wind farm includes a plurality of wind energy installations, a transfer point at which electrical energy produced by the wind energy installations is transferred to a public electricity grid system and for which nominal values are preset, and a measurement sensor configured to measure electrical actual values at the transfer point. The wind farm also includes a master regulator associated with an upper control level and configured to use upper nominal values and upper actual values at the upper control level to determine a preset for a lower control level, and a plurality of submaster regulators associated with the lower control level and configured to use the preset as a lower nominal value and, on the basis of the lower nominal value and a lower actual value, determine presets for the wind energy installations. A high level of control accuracy can thus be achieved even in large wind farms.

15 Claims, 2 Drawing Sheets

(56) References Cited

U.S. PATENT DOCUMENTS

2009/0102198 A1    4/2009  Egedal
2010/0066087 A1*   3/2010  Hayashi et al. ................. 290/44
2010/0268393 A1*  10/2010  Fischle et al. ................. 700/287

FOREIGN PATENT DOCUMENTS

| DE | 10 2004 056 254    | 6/2006 |
| DE | 10 2004 056 254 A1 | 6/2006 |
| EP | 2 061 131          | 5/2009 |
| WO | WO-2004/114493     | 12/2004 |
| WO | WO-2007/065135     | 6/2007 |
| WO | WO2008/146604    * | 12/2008 ................ F03D 7/04 |
| WO | WO-2009/036895     | 3/2009 |
| WO | WO 2009/036895 A2  | 3/2009 |

OTHER PUBLICATIONS

Rodriguez-Amenedo, J. L. (2002). "Automatic Generation Control of a Wind Farm With Variable Speed Wind Turbines," *IEEE Transactions on Energy Conversion* 17(2): 279-284.

* cited by examiner

WIND FARM AND METHOD FOR CONTROLLING A WIND FARM

REFERENCE TO RELATED APPLICATION

This application claims the priority of German Patent Application No. 10 2009 030 725.7, filed Jun. 26, 2009, the contents of which are incorporated herein by reference.

FIELD OF THE INVENTION

The invention relates to a wind farm having a multiplicity of wind energy installations. The wind farm has a transfer point at which the electrical energy produced by the wind energy installations is transferred to a public electricity grid system and for which nominal values are preset. The invention also relates to a method for controlling a wind farm such as this.

BACKGROUND OF THE INVENTION

Until now, a single central regulator has been provided in wind farms, which uses the electrical actual values at the transfer point and the nominal values received from the public electricity grid system to determine presets for the operation of the individual wind energy installations. The individual wind energy installations adjust their operation in accordance with the presets. When added over all the wind energy installations, this leads to new electrical actual values at the transfer point, which the central regulator can in turn compare with the nominal values received from the public electricity grid system. This results in a closed control loop, in which the central regulator acts directly on the wind energy installations.

As wind farms are becoming ever larger, such centralized closed-loop control results in difficulties. The computation complexity obviously rises severely with the number of wind energy installations. Despite a high level of computation complexity, it is not possible to completely solve the problem that changes in the operation of a single wind energy installation may have widely differing effects on the electrical actual values at the transfer point, depending on how far the wind energy installation is away from the transfer point. The further a wind energy installation is away from the transfer point, the lower is the control quality and therefore the greater is the risk of instabilities in the control system.

SUMMARY OF THE INVENTION

Against the background of the prior art mentioned initially, the invention is based on the object of providing a wind farm and a method for controlling a wind farm which allow a high control quality even for large wind farms. The object is achieved by the features broadly disclosed herein. Advantageous embodiments are specified in the detailed description.

A master regulator and a plurality of submaster regulators are provided in the wind farm according to the invention. The master regulator is associated with an upper control level, and the submaster regulators are associated with a lower control level. The master regulator uses upper nominal values and upper actual values to determine lower nominal values for a plurality of submaster regulators. The submaster regulators then use the lower nominal values and associated lower actual values to make presets for a plurality of wind energy installations.

In the method according to the invention for controlling a wind farm, the electrical energy produced by the wind energy installations is transmitted at a transfer point to a public electricity grid system. The actual values are measured at the transfer point and are compared with nominal values obtained from the public electricity grid system. A master regulator which is associated with an upper control level compares upper actual values with upper nominal values and uses them to determine presets for a plurality of submaster regulators. The submaster regulators which are associated with a lower control level take the presets of the master regulator as lower nominal values, compare this with associated lower actual values, and use this to determine a preset for the operation of a plurality of wind energy installations.

First of all, a number of terms will be explained. The nominal values and the actual values each relate to one or more electrical parameters at one point in the electricity grid system within the wind farm, for example the voltage, frequency, reactive power and real power. The actual values can be measured at the relevant point. They can also be calculated for the relevant point on the basis of measured values recorded at a different point.

On one control level, actual values and nominal values for a specific point in the electricity grid system within the wind farm are compared with one another, and a preset is determined for one or more other points in the electricity grid system within the wind farm. At the lowermost control level, an installation regulator acts directly on a single wind energy installation. At the uppermost control level, the actual values are compared with the nominal values at the transfer point. For the purposes of the claims, the lower control level is a control level between this uppermost control level and the installation regulator. One or more further control levels may be provided between the uppermost control level and the installation regulator. The upper control level and the lower control level for the purposes of the claims follow one another directly within this hierarchy, with the presets of the upper control level forming the nominal values for the lower control level. The regulators in the lower level each use the presets of a regulator from the next-higher level as nominal values. More than one master regulator may be provided. The presets of a master regulator are processed by a plurality of submaster regulators. The presets which the plurality of submaster regulators receive from the master regulator may be identical, but in most cases each submaster regulator will receive presets intended specifically for it. From the lower control level, the presets can be transmitted either directly or via one or more further control levels to the plurality of wind energy installations. When a further control level exists, the submaster regulators in the same sense carry out the function of the master regulator for the submaster regulators controlled by them in the next lower control level. Since the individual wind energy installations adapt their electricity production on the basis of the presets from the installation regulators, they influence the actual value at the transfer point, and a closed control loop is formed over all the control levels between the transfer point and the wind energy installations. For the stability of a cascade-like closed-loop control system such as this, it is advantageous for each of the lower control levels to have a shorter time constant than the upper control levels.

The generic term control module covers all regulators which are used in the various control levels. A control module may therefore be a master regulator, a submaster regulator or else an installation regulator. A control module may be designed such that it can be used only in one specific control level. There are also control modules which can be used in different control levels as required, or can be used in a plurality of control levels at the same time.

The wind farm according to the invention has the advantage that the respective control decisions are made closer to the point where they are implemented. For example, at the lower control level, it is possible to consider how far a wind energy installation is away and how long it will take for an amended preset to result in a change in the actual value of this wind energy installation. This improves the control quality.

A further disadvantage of the previous central closed-loop control system is that a failure of the central regulator or of a component of the central regulator cannot be compensated for. If the wind farm no longer receives any presets from the central regulator, in most cases it must be shut down and disconnected from the public electricity grid system. In the case of the invention, a plurality of control modules can be provided, and can each be used as a master regulator. The upper actual values and the upper nominal values are supplied to these control modules, as a result of which they can use them to determine a preset for the next control level. One of the two control modules is operated in an active mode, and the other in a passive mode. Only the presets of the active control module are actually processed at the next control level, while the presets of the passive control module are not used any further. If the active control module fails, a change can be made without any interruption to the other control module, which then switches from the passive mode to an active mode. This also allows any submaster regulator which is in the active mode to be associated with a further control module which is carrying out the same control task in the passive mode.

If two control modules are dealing with the same control task in this way, then the presets which the two control modules make can be matched to one another, in order to detect faults. If the presets of the two control modules match, then this can be taken as an indication that the two control modules are operating correctly. If there are discrepancies between the presets of the two control modules, then a plausibility check can be carried out to determine which of the two presets is incorrect. For example, if the presets of one control module remain at a fixed value, then this indicates that the control module is no longer operating correctly. The presets from the other control module can then be used automatically for the relevant control level. If it is not obvious which of the control modules is faulty, the relevant part of the wind farm may need to be taken out of operation, or downstream regulator modules may need to revert to preset values. In addition, a message can be sent to a control centre in order to allow manual action.

In addition to the control modules operating correctly, the closed-loop control system is also dependent on the control modules being supplied with the correct actual values. For this reason, the measurement sensors for detection of the actual values can each be duplicated. The values produced can be matched to one another in order to detect faults.

Measurement sensors for detection of the actual values can be provided for each control level. It may also be sufficient to measure the actual values only at individual points, for example the transfer point and the wind energy installations, and to calculate the actual values for the other control levels from these measured values. For example, if one submaster regulator is responsible for five wind energy installations, then the actual value which is relevant for the submaster regulator can be calculated from the actual values of the five wind energy installations.

Furthermore, control modules can be provided which can be used selectively as a master regulator or as a submaster regulator. These control modules can be associated with one of the control levels, as required. The control modules may be in the form of separate elements in the wind farm or may be integrated in the wind energy installations. In the latter case, the control module can be used as an installation regulator at the same time, and can provide closed-loop control for the individual wind energy installation.

The closed-loop control system can be designed such that each control module is supplied only with the actual values and nominal values which are applicable to it itself. Each control module then receives only the actual values and nominal values which it requires for its present control task. It is then sufficient for each master regulator to communicate only with the submaster regulators which are associated with it, and there is no need for submaster regulators of the same level to communicate with one another or to interchange information with one another. Alternatively, it is possible for the actual values and nominal values applicable to one control module also to be transmitted to other control modules which are currently not carrying out any control task but are arranged in the same control level, or which are active in a different control level. This allows the control modules to change backwards and forwards between the control tasks more easily.

The closed-loop control system is preferably designed such that the control modules are organized automatically. For example, the control module which is associated with a wind energy installation which will be the first to start operating again after a shutdown can determine that it is the only active control module. This control module will then register itself as the master regulator, and will process the actual values and nominal values from the transfer point. The next control module to start operating finds that a master regulator is already active, and registers itself as a submaster regulator, processing the presets from the master regulator. The next control modules then likewise register themselves as submaster regulators, until sufficient regulators are active for this control level. The subsequent control levels are filled successively, until the last control modules to become active act only as installation regulators for a single wind energy installation.

If a master regulator fails, then it is not always possible for the relevant control task to be transferred seamlessly to another control module. In a situation such as this, or else if a data link is interrupted, it is possible for the submaster regulators which depend on this master regulator not to receive any presets for a period of time. The submaster regulators can be designed such that they continue to use the most recently received preset for processing, for a predetermined time period. They can then revert to preselected values.

Alternatively, it is possible for the upper actual values and the upper nominal values used by the master regulator also to be supplied to the submaster regulators. If the master regulator fails, the submaster regulators can be immediately oriented with these upper actual values and upper nominal values. For example, the submaster regulators can continue to use the presets for processing, which they received before the failure of the master regulator, until the difference between the upper actual value and the upper nominal value exceeds a predetermined threshold.

BRIEF DESCRIPTION OF THE DRAWINGS

The invention will be described in the following text using advantageous embodiments, by way of example, and with reference to the attached drawings, in which.

DETAILED DESCRIPTION OF THE INVENTION

Figure 1:
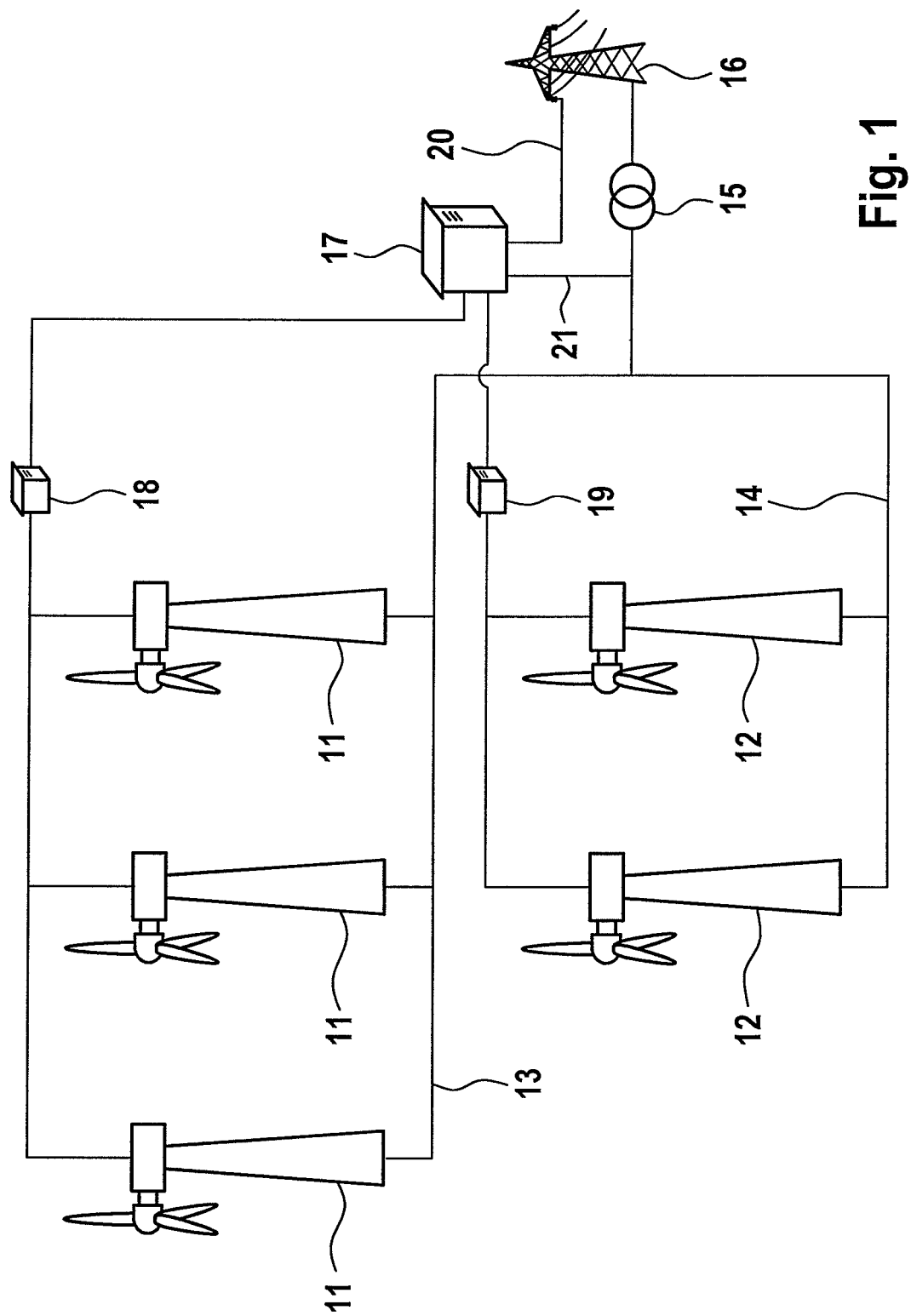
FIG. 1 shows a first embodiment of a wind farm according to the invention.

A wind farm which is shown in FIG. 1 comprises five wind energy installations 11, 12, with the wind energy installations 11 being associated with a first section 13, and with the wind energy installations 12 being associated with a second section 14. The term section refers to a group of wind energy installations which electrically feed to a common point in the wind farm and are (physically) connected one behind the other to a common supply line. The electrical energy produced in the wind farm is transferred to a public electricity grid system 16 at a transfer point 15. The wind farm receives presets from the public electricity grid system 16, relating to the electrical values at the transfer point 15, such as the voltage, frequency, reactive power component or real power.

The wind farm has a regulator structure which is intended to ensure that specific nominal values are maintained at the transfer point 15. The nominal values can be defined on a one-off basis or be transmitted continually as new from the public electricity grid system 16. By way of example, the nominal value for the frequency is fixed here, and the relevant value is stored in the master regulator. In contrast, the master regulator continually receives new nominal values, for example for the reactive power component of the volt-amperes emitted from the wind farm, via a line 20 from the public electricity grid system 16. The regulator structure comprises a master regulator 17 and two submaster regulators 18, 19, which are each associated with one of the sections 13, 14. The master regulator 17 receives the actual electrical values at the transfer point 15 via a line 21. If the nominal values differ from the actual values at the transfer point 15, then the master regulator 17 determines new presets for the wind farm. The presets are not intended for the individual wind energy installations 11, 12 but for the submaster regulator 18 for the section 13 and the submaster regulator 19 for the section 14, in which case the submaster regulator 18 and the submaster regulator 19 receive different presets. The submaster regulators 18, 19 use the presets from the master regulator 17 as nominal values for the respective section 13, 14. If the actual values in the sections 13, 14 differ from the nominal values of the submaster regulators 18, 19, the submaster regulators 18, 19 determine new presets for the individual wind energy installations 11, 12. The presets of the submaster regulators 18, 19 are implemented by installation regulators, which are not illustrated, for the wind energy installations 11, 12. If the operating state of the wind energy installations 11, 12 varies, then the actual values in the sections 13, 14 vary and approach the nominal values. If the electrical values in the sections 13, 14 vary, then the electrical values at the transfer point 15 also vary and the control loop is closed by the master regulator 17 via the submaster regulators 18, 19 and the wind energy installations 11, 12.

By way of example, if the master regulator 17 has the preset from the public electricity grid system 16 that a specific amount of reactive power should be transferred, then the master regulator 17 will subdivide this preset between the submaster regulators 18, 19. The submaster regulator 18 which is responsible for the section 13 with three wind energy installations 11 receives, for example, the preset to supply ⅗ of the required reactive power. The submaster regulator 18 in turn distributes this preset between the three wind energy installations 11. For example, it is possible for each of the wind energy installations 11 to have to supply ⅕ of the demanded reactive power. Alternatively, the preset from the submaster regulator 18 can take account of the wind energy installations 11 being arranged at different distances from the transfer point 15, and can appropriately adapt the presets to the wind energy installations 11. In a further alternative, the submaster regulator 18 can take account of the control margin available to the individual wind energy installations 11, and can adapt the presets to the individual wind energy installations in proportion to the difference between the nominal value and the available control margin. The submaster regulator 19 which is responsible for the section 14 with two wind energy installations 12 would in this example receive the preset from the master regulator to supply ⅖ of the required reactive power. The submaster regulator 19 can in turn distribute this preset between its wind energy installations 12 such that each supplies ⅕ of the required reactive power.

The wind farm in FIG. 1 has an upper control level, for which the master regulator 17 is responsible, and a lower control level, in which the submaster regulators 18, 19 are active in parallel with one another. With the master regulator 17 and the submaster regulators 18, 19, there are three control modules in the wind farm for the upper and the lower control levels, and the installation regulators for the individual wind energy installations 11, 12 are further control modules. The presets received from the public electricity grid system 16 correspond to the upper nominal values for the master regulator 17, and the electrical values measured at the transfer point 15 correspond to the upper actual values for the master regulator 17. The presets received from the master regulator 17 are the lower nominal values for the submaster regulators 18, 19. The electrical values which are actually present in the sections 13 and 14 correspond to the lower actual values for the submaster regulators 18, 19. The electrical values in the sections 13 and 14 are not measured directly, but are calculated from the actual values at the wind energy installations 11, 12.

If the master regulator 17 fails, then the submaster regulators 18, 19 no longer receive any presets from the master regulator 17. In one alternative, the wind farm is prepared for this situation by additionally storing the functionality of the master regulator in the submaster regulator 18. Immediately after the failure of the master regulator 17, the data transmission is switched over such that the upper nominal values and the upper actual values are transmitted to the submaster regulator 18. In its function as the new master regulator, the submaster regulator 18 determines presets for the lower control level. For the section 13, the submaster regulator 18 processes the presets directly itself, and for the section 14 the presets are transmitted to the submaster regulator 19. Since the submaster regulator 18 identically simulates the function of the master regulator, the wind farm can continue to operate without any restrictions.

In one alternative embodiment, in which the functionality of the master regulator is not redundant, the upper nominal values and the upper actual values of the master regulator 17 are also transmitted to the submaster regulators 18, 19. If the master regulator 17 fails, the submaster regulators 18, 19 continue to operate with the presets most recently received from the master regulator 17 and in this case continuously monitor the development of the upper actual values and the upper nominal values. The operation based on the most recently received presets continues until the difference between the upper actual values and the upper nominal values exceeds a predetermined threshold. After exceeding the threshold, the submaster regulators 18, 19 revert to a preselected reversionary mode. In the reversionary mode, the upper nominal values are simply subdivided on a percentage basis between the submaster regulators 18, 19. After this, for example, the section 13 with its three wind energy installations 11 receives the fixed preset to provide ⅗ of the reactive power required as the upper nominal value, while ⅖ is provided by the two wind energy installations 12 in the section 14.

Figure 2:
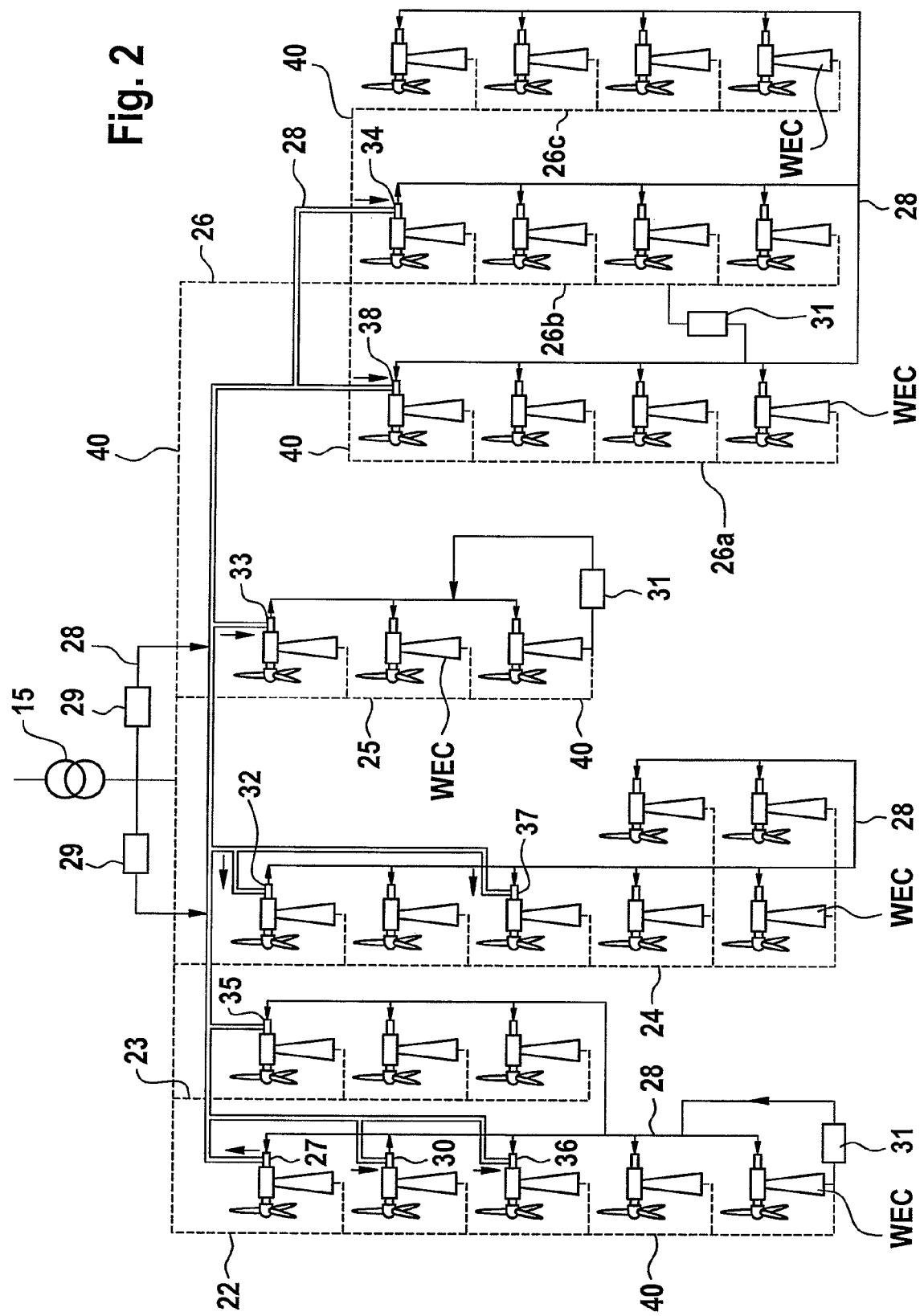
FIG. 2 shows a schematic illustration of a second embodiment of a wind farm according to the invention.

In the embodiment shown in FIG. 2, the wind energy installations WEC are distributed between five sections 22, 23, 24, 25, 26. The section 22 has five wind energy installations WEC, the section 23 has three wind energy installations WEC, the section 24 has seven wind energy installations WEC, the section 25 has three wind energy installations WEC and the section 26 has twelve wind energy installations WEC. The electric power produced by the wind energy installations WEC is passed to the transfer point 15 via an electricity grid system 40 within the wind farm, which is represented by dashed lines. A control module is integrated in each of the wind energy installations WEC, and no further control modules separate from the wind energy installations WEC are provided. Each control module has the functionality of acting as an installation regulator for its own wind energy installation WEC. When acting as an installation regulator, the control module receives presets from a subordinate control level, and sets the wind energy installation in accordance with the presets. All the control modules in the wind farm are connected, and can communicate with one another, via a data network 28.

Furthermore, each of the control modules has the functionality of additionally acting as a submaster regulator for the section to which the relevant wind energy installation WEC belongs, or to act as a master regulator for the entire wind farm. In the operating state illustrated in FIG. 2, the control module for the wind energy installation WEC which is illustrated right at the top in the section 22 is carrying out the task of the master regulator 27 for the entire wind farm. The master regulator 27 is informed via the data network 28 both of the presets from the public electricity grid system and of the actual electrical values that are present at the transfer point 15. Redundant measurement sensors 29 are provided in order to determine the actual electrical values of the transfer point 15. The master regulator 27 receives the presets from the public electricity grid system as the upper nominal value, and the actual electrical values at the transfer point 15 as the upper actual value, and uses them to determine presets for the lower control level. The master regulator 27 is associated with the upper control level in the wind farm. The presets from the master regulator 27 are transmitted via the data network 28 to the lower control level. That part of the data network 28 via which the presets of the upper control level are transmitted is illustrated in the form of a double line, in order to illustrate it better, with the arrows indicating the direction in which the presets are transmitted.

At the lower control level, the wind farm is subdivided into segments. One submaster regulator is active in each segment and implements the presets received from the master regulator 27 as presets for the individual wind energy installations. By way of example, the presets may comprise the presets received from the public electricity grid system being distributed on a percentage basis between the segments. The presets are distributed between the individual control modules via the data network 28. This part of the data network 28 is represented as a normal line, with the arrows indicating the direction in which the presets are passed. It may be sufficient for each control module to receive only the information which is applicable to the segment to which the relevant wind energy installation WEC belongs. Alternatively, it is possible for each control module to be informed of the presets of all the segments.

In the wind farm shown in FIG. 2, the first segment in the lower control level comprises the sections 22 and 23. The control module 30 for the section 22 is active as the submaster regulator 30 for the sections 22 and 23. This processes the presets from the master regulator 27 as the lower nominal value, and processes the electrical values which are actually present in the sections 22 and 23 as the lower actual value. The information relating to the relevant actual values originates from the measurement sensor 31 which is connected to the section 22. The submaster regulator 30 determines presets for the individual wind energy installations WEC in the sections 22 and 23. The control modules for the wind energy installations WEC act as installation regulators and adjust the operation of the individual wind energy installations WEC in accordance with the presets from the submaster regulator 31. In particular, the master regulator 27 is in addition also active as an installation regulator for its wind energy installation WEC, and, in this function, implements the presets received from the submaster regulator 30 for its wind energy installation.

The other segments in the lower control level each correspond to the sections 24, 25, 26. The control module 32 in the section 24 is active as a submaster regulator, the control module 33 in the section 25 is active as a submaster regulator, and the control module 34 in the section 26 is active as a submaster regulator. In the sections 25 and 26, 31 once again indicates the measurement sensors for the actual electrical values. The lower actual values originate from the measurement sensors 31. The direction in which the presets are distributed from the submaster regulators 30, 32, 33, 34 via the part of the data network 28 which is shown using normal lines to the control modules for the individual wind energy installations WEC is indicated by arrows in the data network 28.

In addition to the master regulator 27 and the submaster regulators 30, 32, 33, 34 which actively carry out the relevant control task, control modules are in each case provided which have the same control task, but carry it out only in a passive form. The control task is referred to as being carried out actively when the presets determined by the control module are actually processed by a downstream control module. The control task is referred to as being carried out passively when, although a control module determines the presets for downstream control modules, the presets are, however, not processed. In parallel with the active master regulator 27, the control module 35 carries out the task of the passive master regulator. In parallel with the active submaster regulators 30, 32, 34, the control modules 36, 37, 38 are used as passive submaster regulators. If one of the active control modules fails, then the associated passive control module can step in without any interruption, and can take over the relevant control task. All the control modules in the wind farm are informed of which passive control modules will step in for which active control modules, and they react appropriately. Furthermore, a priority list is used to define which control module will now take over the role of the passive control module once the previous passive control module has become the active control module.

During continuous operation of the wind farm, the presets determined by the active control module and the associated passive control module are regularly compared with one another. If the presets in the control modules match, then this is an indication of fault-free operation. If there is a discrepancy, a message is immediately sent to a control centre, in order that a decision could be made there as to whether any external action is required. If appropriate, a remote command can be used to define which control module will be treated as the active one. In the same way, the data from redundant measurement sensors is continuously compared in order to make it possible to react at an early stage to faults in this area.

If the master regulator 27 now fails, then this information is disseminated via the data network 28. The control module 35 which has carried out the functionality of the master regulator only on a passive basis then changes to the active mode. For the submaster regulators 30, 32, 33, 34 this leads to them now processing the presets from the control module 35 as nominal values. Nothing changes for the individual installation regulators, and they still receive their presets from the submaster regulators 30, 32, 33, 34. In this way, the operation of the wind farm is continued without any interruption. The operation can also be continued without interruption in an analogous manner if one of the submaster regulators fails. The function of the failed submaster regulator can be taken over by another submaster regulator or by a control module which was until then active only as an installation regulator.

FIG. 2 shows a possible configuration which the regulator structure in the wind farm can assume. In other operating states, completely different control modules may be active as the master regulator and submaster regulators. For example, when the wind farm is started up again after a shutdown, then the control module for the wind energy installation WEC, which is the first to start operation again, registers itself as the master regulator. The first control module from each segment then in each case registers itself as an active submaster regulator, and the second control module registers itself as a passive submaster regulator. The subsequent control modules find that all the control tasks in the upper control level and the lower control level are already being carried out, and register themselves as simple installation regulators. The control modules communicate with one another via the data network 28, in order to find out which control tasks are still free.

The section 26 of the wind farm is subdivided into further sections 26a, 26b, 26c. The submaster regulator 34 in FIG. 2 directly sets presets for the wind energy installations WEC in all the sections 26a, 26b, 26c. It is also possible to once again consider the sections 26a, 26b, 26c be a specific control level, with a sub-submaster regulator being provided in each section, which receives the presets from the submaster regulator 34 and implements them as presets for the individual wind energy installations in the relevant section.

The invention claimed is:

1. A wind farm comprising:
a plurality of wind energy installations comprising a first wind energy installation and a second wind energy installation;
three control levels comprising a wind farm upper control level, a wind farm lower control level and a wind energy installation control level, the lower control level being between the upper control level and the installation control level;
a master regulator associated with the wind farm upper control level, a plurality of submaster regulators associated with the wind farm lower control level and a plurality of installation regulators associated with the wind energy installation control level, the plurality of submaster regulators comprising a first submaster regulator and the plurality of installation regulators comprising a first installation regulator associated with the first wind energy installation and a second installation regulator associated with the second wind energy installation;
a transfer point at which electrical energy produced by the wind energy installations is transferred to a public electricity grid system and for which nominal values are preset; and
a measurement sensor configured to measure electrical actual values at the transfer point, wherein
the master regulator is configured to use upper nominal values and upper actual values at the upper control level to determine a preset for the lower control level; and
the first submaster regulator is configured to use the preset as a lower nominal value and, on the basis of the lower nominal value and a lower actual value, determine a preset for the first installation regulator and the second installation regulator.

2. The wind farm of claim 1, further comprising a plurality of control modules configured to be used as the master regulator.

3. The wind farm of claim 1, further comprising a control module configured to be used selectively as the master regulator, as a submaster regulator, or as an installation regulator for a single wind energy installation.

4. The wind farm of claim 1, further comprising a control module configured to be used at the same time as the master regulator, as a submaster regulator, or as an installation regulator for a single wind energy installation.

5. The wind farm of claim 1, further comprising two measurement sensors configured to measure the same electrical actual values at the transfer point.

6. A method for controlling a wind farm comprising a plurality of wind energy installations comprising a first wind energy installation and a second wind energy installation, three control levels comprising a wind farm upper control level, a wind farm lower control level and a wind energy installation control level, the lower control level being between the upper control level and the installation control level, a master regulator associated with the wind farm upper control level, a plurality of submaster regulators associated with the wind farm lower control level and a plurality of installation regulators associated with the wind energy installation control level, the plurality of submaster regulators comprising a first submaster regulator and the plurality of installation regulators comprising a first installation regulator associated with the first wind energy installation and a second installation regulator associated with the second wind energy installation, the method comprising:
transferring at a transfer point electrical energy produced by the wind energy installations to a public electricity grid system;
comparing, by the master regulator, upper actual values measured at the transfer point and upper nominal values obtained from the public electricity grid system to determine a preset for the lower control level; and
comparing, by the first submaster regulator, the preset, as a lower nominal value, with a lower actual value to determine a preset for the operation of the first installation regulator and the second installation regulator.

7. The method of claim 6, wherein a second control module provided on the upper control level having the same control task as the master regulator actively takes over the control task of the master regulator in response to failure of the master regulator.

8. The method of claim 7, wherein presets of the master regulator and of the second control module are compared with one another.

9. The method of claim 6,
wherein a control module associated with one wind energy installation makes a check at a time that the one wind energy installation is started to determine which other control modules are already active, and wherein the check is used to decide whether the control module is activated as a master regulator, as a submaster regulator, or as an installation regulator for the one wind energy installation.

10. The method of claim 6, wherein the upper actual values and upper nominal values are additionally transmitted to the submaster regulators.

11. The method of claim 6, wherein the lower actual value is calculated from a plurality of installation actual values.

12. The method of claim 6, wherein a measurement sensor measures the lower actual value.

13. The method of claim 6, wherein, in response to a submaster regulator no longer receiving any presets from the master regulator, the submaster regulator continues to operate for a predetermined time period with the presets most recently received from the master regulator and then reverts to predetermined lower nominal values.

14. The method of claim 12, wherein the lower actual values measured by the measurement sensor and applicable to a submaster regulator are transmitted to all the submaster regulators.

15. The method of claim 6, wherein a preset applicable as a lower nominal value for a submaster regulator is transmitted to all the submaster regulators.

* * * * *